(12) United States Patent
Yu

(10) Patent No.: US 10,616,713 B1
(45) Date of Patent: Apr. 7, 2020

(54) SYSTEM AND METHOD FOR LOCATION BASED ANALYSIS TO OPERATE A DEVICE OR APPARATUS

(71) Applicant: Chengfu Yu, Irvine, CA (US)

(72) Inventor: Chengfu Yu, Irvine, CA (US)

( * ) Notice: Subject to any disclaimer, the term of this patent is extended or adjusted under 35 U.S.C. 154(b) by 0 days.

(21) Appl. No.: 16/569,638

(22) Filed: Sep. 12, 2019

(51) Int. Cl.
　*H04W 4/021*　　(2018.01)
　*H04W 4/02*　　(2018.01)
　*H04L 29/08*　　(2006.01)
　*H04W 64/00*　　(2009.01)
　*H04W 12/00*　　(2009.01)
　*H04W 4/029*　　(2018.01)

(52) U.S. Cl.
　CPC ............ *H04W 4/022* (2013.01); *H04L 67/18* (2013.01); *H04W 4/023* (2013.01); *H04W 4/029* (2018.02); *H04W 12/00503* (2019.01); *H04W 64/006* (2013.01)

(58) Field of Classification Search
　CPC .............................. H04W 4/021; H04W 4/022
　See application file for complete search history.

(56) References Cited

U.S. PATENT DOCUMENTS

| 2013/0217411 | A1* | 8/2013 | Croy | H04W 4/021 |
| | | | | 455/456.1 |
| 2018/0084380 | A1* | 3/2018 | Lucas | G06Q 30/014 |
| 2019/0102146 | A1* | 4/2019 | Swift | H04W 4/02 |
| 2019/0281408 | A1* | 9/2019 | Zhao | H04W 4/021 |

\* cited by examiner

*Primary Examiner* — Myron Wyche
(74) *Attorney, Agent, or Firm* — Arman Khosraviani

(57) ABSTRACT

A server comprising a communication port for obtaining a plurality of geographical boundaries associated with an address and current location data from a computing device, the current location data including a current location of the computing device, a processor operatively coupled to a memory and the communication port for comparing current location data with each of the plurality of geographical boundaries to determine whether to adjust the frequency of current location data obtained from computing device, wherein the current location data is stored on the memory and the processor compares subsequent and current location data to form one or more validated paths within the plurality of geographical boundaries, and upon reaching an endpoint of one of the validated paths along the plurality of geographical boundaries causes the server to transmit data to the computing device comprising instructions to invoke an application on the computing device to operate a smart device.

17 Claims, 9 Drawing Sheets

SYSTEM AND METHOD FOR LOCATION BASED ANALYSIS TO OPERATE A DEVICE OR APPARATUS

CROSS-REFERENCE TO RELATED APPLICATIONS

The entire contents of the following applications are incorporated herein by reference: U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD. Nonprovisional patent application Ser. No. 18/18,275 filed on Nov. 20, 2017; and entitled AUTOMATED SMART DOORBELL DEVICE AND METHOD. Nonprovisional patent application Ser. No. 15/888,425 filed on Feb. 5, 2018; and entitled SMART PANEL DEVICE AND METHOD. Nonprovisional patent application Ser. No. 15/944,696 filed on Apr. 3, 2018; and entitled SMART TRACKER DEVICE AND METHOD. Nonprovisional patent application Ser. No. 16/056,276 filed on Aug. 6, 2018; and entitled SMART CAM DEVICE AND METHOD. Nonprovisional patent application Ser. No. 16/219,626 filed on Dec. 13, 2018; and entitled SYSTEM AND METHOD FOR CONNECTING A NETWORK CAMERA. Nonprovisional patent application Ser. No. 16/372,053 filed on Apr. 1, 2019; and entitled SMART ACTIVE CAMERA DEVICE AND METHOD. Nonprovisional patent application Ser. No. 16/418,998 filed on May 21, 2019; and entitled ACCESS VERIFICATION DEVICE AND METHOD. Nonprovisional patent application Ser. No. 16/506,965 filed on Jul. 9, 2019; and entitled SMART LOCK DEVICE AND METHOD.

FIELD

The present invention is directed to systems and methods for geographic positioning and analysis for operating a device within a dwelling, and more particularly to systems and methods wherein a user within a vehicle communicates with a server using the user's electronic device, and the server is configured to process the user crossing one or more geographic perimeters relative to the dwelling to create a data set for operating the device based on the user's geographic positions.

BACKGROUND

Existing security cameras, smart devices, and security systems for homes and commercial properties may be configured to use third-party apps or integrate with computer software to operate based on geofencing. The user may define a geo-fence, or geographic perimeter or border around a dwelling or building. Once the geo-fence border is crossed by a user or device, the camera or device associated to the dwelling or building performs an operation. The user's location may be relayed to a server through, for example, the user's mobile device, then location is analyzed by the server and communicated to the third-party app or computer software to operate the camera or device.

Geo-fencing may provide significant convenience for consumers by enabling automation of security and entry point devices such as a smart lock or garage door opener. Geo-fencing further may enable personal reminders to accomplish certain tasks when the user is in the area of a geo-fence as they approach a dwelling or commercial building. Moreover, consumer devices with geo-fencing capabilities or pets with geotags may be monitored to ensure they do not leave or alter the dwelling's or devices' geo-fence.

However, a number of security concerns exist with the use of geofencing. One security concern involves a geofence being triggered inadvertently to operate a smart lock or garage door opener to open as users move in and out of the perimeter of the geofence while approaching or leaving a dwelling. For example, the user may leave the dwelling by taking one or more alternate routes that fall inside and outside the perimeter of the geo-fence for a garage door opener. Upon entering and leaving the perimeter of the geo-fence for the garage door opener, the garage door opener will be triggered to open contemplating the user approaching to enter the dwelling when the user is crossing the geo-fence perimeter to leave the area of the dwelling.

In cases where the device is an entry point device, for example, a smart lock or garage door or gate opener, inadvertent triggering of the geofence to open a door or garage can pose serious security concerns. To account for inadvertent triggering of the geofence, the geo-fencing is complimented with the user's home or local WiFi™ connection and Bluetooth connection with the device to corroborate a user approaching a dwelling. Once the GPS location, WiFi™ and Bluetooth connections are confirmed the entry point device is triggered to open. While this may provide better security, a WiFi™ outage, Bluetooth bug, device issue may prevent the geo-fence from triggering the device or the device from operating. Moreover, verifying through Bluetooth, WiFi™, and user's GPS location information can cause substantial drain of resources of a mobile device or wearable device.

Furthermore, while utilizing these methods and resources may enable geo-fencing for entry, the same methods no longer work as users exit the dwelling and leave the geo-fence. To ensure the garage or door is closed and the dwelling is secure, the geo-fence perimeter must be impractically small which would be set by the user. The user must then determine how small to set the geo-fence perimeter, which invariably requires using Bluetooth, WiFi™, and other resources to constantly verify the location and intentions of the user.

In alternate cases, to account for a more secure method, the entry point device or mobile application or mobile device may become unresponsive due to the multitudes of resources, sometimes conflicting, that are used to establish a geo-fence crossing. In such instances, the device may not see a geo-fence crossing or respond fast enough to facilitate automation of operating an entry point device thus ruining the user experience or user convenience.

Thus, there is a need for systems and methods that minimize computer resource usage for mobile and wearable devices for triggering a geo-fencing operation of a consumer device while ensuring the consumer device are not inadvertently triggered while entering and leaving a geo-fence perimeter.

SUMMARY

The disclosed subject matter relates to a server comprising a communication port for obtaining a plurality of geographical boundaries associated with an address and for obtaining current location data from a computing device, the current location data including a current location of the computing device, a processor, the processor being operatively coupled to a memory and to the communication port, for comparing the current location data with each of the plurality of geographical boundaries to determine whether to adjust the frequency of current location data obtained from the computing device, wherein the current location data is stored on the memory and wherein the processor compares subsequent location data with current location data to form one or more validated paths within the plurality of geographical boundaries, the subsequent location data including a location of the computing device subsequent to the current location of the computing device, and wherein upon reaching an endpoint of one of the one or more validated paths along the plurality of geographical boundaries causes the server to transmit data to the computing device, wherein the data comprises instructions to invoke an application on the computing device to operate a smart device.

The disclosed subject matter further relates to a computer-implemented method performed by a computing device having a processor operatively coupled to a memory, the method comprising: obtaining a plurality of geographical boundaries associated with an address, obtaining a current location data from a remote computing device, the current location data including a current location of the remote computing device, comparing the current location data with each of the plurality of geographical boundaries to determine whether to adjust the frequency of current location data obtained from the remote computing device, storing the current location data in the memory, forming one or more validated paths within the plurality of geographical boundaries by comparing subsequent location data with current location data, the subsequent location data including a location of the remote computing device subsequent to the current location of the remote computing device, and transmitting data to the computing device upon reaching an endpoint of one of the one or more validated paths along the plurality of geographical boundaries, wherein the data comprises instructions to invoke an application on the remote computing device to operate a smart device.

The disclosed subject matter further relates to a non-transitory machine-readable medium comprising instructions stored therein, which, when executed by one or more processors of a processing system cause the one or more processors to perform operations comprising: obtaining a plurality of geographical boundaries associated with an address, obtaining a current location data from a remote computing device, the current location data including a current location of the remote computing device, comparing the current location data with each of the plurality of geographical boundaries to determine whether to adjust the frequency of current location data obtained from the remote computing device, storing the current location data in the memory, forming one or more validated paths within the plurality of geographical boundaries by comparing subsequent location data with current location data, the subsequent location data including a location of the remote computing device subsequent to the current location of the remote computing device, and transmitting data to the computing device upon reaching an endpoint of one of the one or more validated paths along the plurality of geographical boundaries, wherein the data comprises instructions to invoke an application on the remote computing device to operate a smart device.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

Figure 1:
FIG. 1 illustrates an exemplary embodiment of geographic location overlays for location analysis and pattern mapping of a vehicle entering one or more geographic areas according to one or more exemplary embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Various features of the present disclosure will now be described and is not intended to be limited to the embodiments shown herein. Modifications to these features and embodiments will be readily apparent to those skilled in the art, and the principles defined herein may be applied to other embodiments without departing from the scope of the disclosure.

Geo-fencing applications and systems typically comprise of setting a virtual geographic boundary for performing one or more actions by an electronic device once the boundary is crossed by a user's device. The electronic device may receive instructions to perform one or more actions upon providing its location to a Location Based Service (LBS) provider or server, or the electronic device may provide location information to a remote Location Based Service (LBS) provider or server that is used to determine whether to perform one or more actions by another electronic device. The virtual geographic boundary typically requires setting a center point corresponding to a home or building and a radius corresponding to the triggering location or distance. Once an electronic device having LBS crosses the triggering location or distance a series of events, for example, video recording, alert notification, etc., may be triggered by a second remote electronic device.

A number of problems exist with geo-fencing applications and systems. If multiple locations along the virtual boundary are crossed in a short period of time, the LBS provider or server cannot accurately generate the signal to perform an action by the electronic device. To account for multiple trigger points, the LBS provider or server introduces a delay to determine a subsequent location of the electronic device prior to generating a signal to perform an action by the electronic device. While the delay may avoid repeated operations by the electronic device, it introduces uncertainty for users as to whether the electronic device will perform the intended action, which negatively impacts user experience.

Moreover, a simple virtual geographic boundary may be too sensitive or too responsive operating an electronic device wherever a user passes a geo-fence instead of a predictable or deterministic path that may be assigned to one or more actions.

FIG. 1 illustrates an exemplary embodiment of geographic analysis, geographic perimeter designation, and geographic data collection for facilitating geofencing according to one or more exemplary embodiments of the present disclosure. The exemplary geographic perimeter overlays 150a-150d may correspond to a building 105. The building 105 may include one or more smart appliances 103 or local electronic devices 541 responsive to the location and/or trajectory of a computing device 501 (e.g. smart phone 532, smart watch 536, tablet 534, smart vehicle 537) within the geographic perimeter overlays 150a-150d. The individual areas A, B, C, and D are formed between the geographic perimeter overlays 150a-150d. The operation and responsiveness of the one or more smart appliances 103 (e.g. garage door opener) or local electronic devices 541 may be defined by the presence of one or more computing devices 501 located within the individual areas A, B, C, and D).

By way of example, and not limitation, the location, velocity, and trajectory of computing device 501 within a vehicle 1a-1h through areas A, B, C, and D may define the operation or responsivity of smart appliances 103 or local electronic devices 541. Similarly, the location, velocity, and trajectory of computing device 501 within areas A, B, C, and D may further define how frequent coordinates, velocity, and trajectory of the computing device 501 is collected and evaluated by a server 511, local electronic devices 541, or a remote computing device to facilitate geographic analysis, data collection, path validation (e.g. stitching potential vehicle pathways), and operation of smart appliances 103 and local electronic devices 541.

As shown in FIG. 1, within each area B, C, and D, a triggering distance $d_{AB}$, $d_{BC}$, and $d_{CD}$ along a street, road, or path and may be defined. The triggering distances $d_{AB}$, $d_{BC}$, and $d_{CD}$ begin at an outer perimeter and end at an inner perimeter to indicate the distance or area covered from the outer perimeter. The exemplary area B, bounded by, for example, perimeter 150a and perimeter 150b may define one or more triggering distances $d_{AB}$. The triggering distance $d_{AB}$ may be defined as starting from the radius of perimeter 150b and ending at the radius of perimeter 150a and moving from the coordinates along perimeter 150b to the coordinates along perimeter 150a. Similarly, the exemplary area C, bounded by, for example, perimeter 150b and perimeter 150c may define one or more triggering distances $d_{BC}$. The triggering distance $d_{BC}$ may be defined as starting from the radius of perimeter 150c and ending at the radius of perimeter 150b and moving from the coordinates along perimeter 150c to the coordinates along perimeter 150b. Similarly, the exemplary area D, bounded by, for example, perimeter 150c and perimeter 150d may define one or more triggering distances $d_{CD}$. The triggering distance $d_{CD}$ may be defined as starting from the radius of perimeter 150d and ending at the radius of perimeter 150c and moving from the coordinates along perimeter 150d to the coordinates along perimeter 150c. Moreover, a plurality of triggering distances may be defined within each area B, C, and D.

In some exemplary embodiments, triggering distances $d_{AB}$, $d_{BC}$, and $d_{CD}$ may be configured to indicate the area or distance covered along the street, road, or path towards an inner perimeter. Still in other exemplary embodiments, triggering distances $d_{AB}$, $d_{BC}$, and $d_{CD}$ may be configured, for example, to indicate the amount or percentage of a radius traversed of an outer perimeter. For example, triggering distance $d_{A3B3}$ indicates a fraction of radius traversed ($d_{A3B3}$=25% of radius of the disc $R_B$–$R_A$) by vehicle 1g passing through area B. Whereas, triggering distance $d_{A1B1}$ indicates complete radius traversal ($d_{A1B1}$=100% of radius of the disc $R_B$–$R_A$) by vehicle 1h from area B and into area A. It should be noted, that any configuration combination of the above triggering distances $d_{AB}$, $d_{BC}$, and $d_{CD}$ may be used, so long as the path and heading of vehicles 1a-1h are better determined to aid in defining the operational states for one or more computing devices 501, smart appliances 103, or local electronic devices 541.

In some exemplary embodiments, perimeters 150b-150d, areas B, C, and D, and triggering distances $d_{AB}$, $d_{BC}$, and $d_{CD}$ may be used to determine entry into building 105 by a vehicle 1a-1h or computing device 501. Perimeter 105a and area A may be used to determine exit from building 105 by a vehicle 1a-1h or computing device 501. In other exemplary embodiments, perimeters 150a-150d, areas A, B, C, and D, and triggering distances $d_{AB}$, $d_{BC}$, and $d_{CD}$ may be used to determine entry into and exit from building 105 by a vehicle 1a-1h or computing device 501. It should be noted, that any combination of perimeters 150a-150d, areas A, B, C, and D, and triggering distances $d_{AB}$, $d_{BC}$, and $d_{CD}$ may be used to determine entry into and exit from building 105 by a vehicle 1a-1h or computing device 501.

Referring to FIG. 1, area B may include, by way of example and not limitation, tangential boundaries along perimeter 150b that define entry points 110a-110d into area B along a street, road, or path. The entry points 110a-110d into area B, as well as entry points into areas A, C, and D, may define one or more operational states for one or more computing devices 501, smart appliances 103, or local electronic devices 541. The operational states may facilitate location, velocity, and trajectory determination of computing device 501 within areas A, B, C, and D which in turn may define how frequent coordinates, velocity, and trajectory of the computing device 501 is collected and evaluated by a server 511, local electronic devices 541, or a remote computing device to facilitate geographic analysis, data collection, path validation, and operation of smart appliances 103 and local electronic devices 541.

Figure 2A:
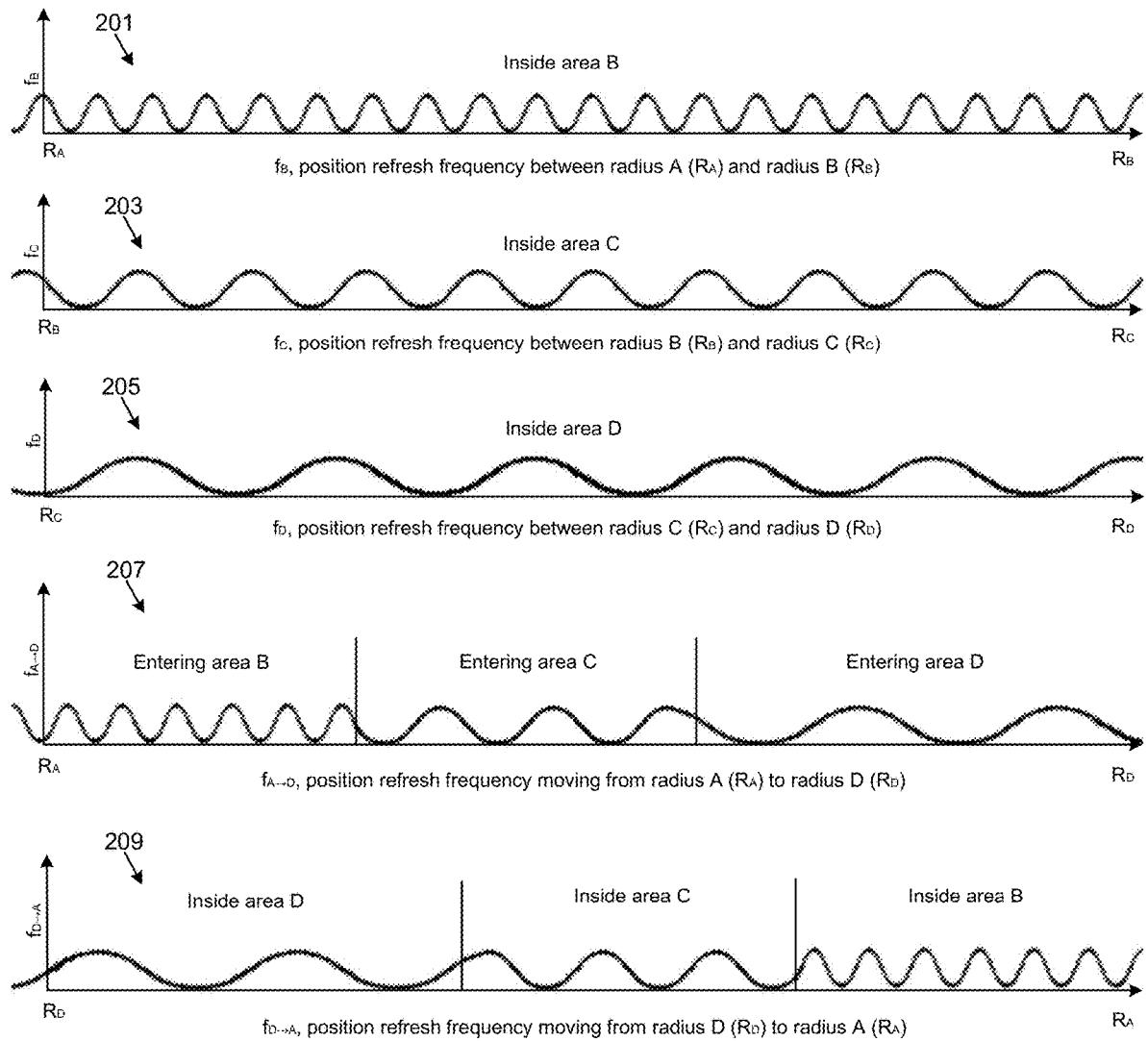
FIG. 2A illustrates an exemplary embodiment of location-based position refresh frequencies according to vehicle geolocation within the geographic areas of FIG. 1, according to one or more exemplary embodiments of the present disclosure.

FIG. 2A illustrates exemplary embodiments of position refresh frequency states 201, 203, 205, 207, and 209 of computing devices 501 (e.g. mobile devices within vehicles 1a-1h, smart vehicle, etc.,) and/or vehicles 1a-1h. The position refresh frequencies 201, 203, 205, 207, and 209 within areas B, C, and D may be used for path validation of computing devices 501 and/or vehicles 1a-1h to enable location-based services (LBS), for example, geo-fencing. To provide accurate path validation of computing devices 501 and/or vehicles 1a-1h approaching building 105, the position refresh frequency rates may be increased to help determine the intention of the driver and/or store the driving behaviors and path validation (e.g. valid driving pathways) in a user/driver database on a server 511, computing device 501, local electronic device 541, or other remote computing device. Moreover, the driving behaviors and potential paths taken by vehicle 1a-1h may be used to either decrease or increase the number of areas A-D and position refresh frequency states. Thus, generating a map of roads a user/driver may use as possible entry points to arrive at building 105. As shown in FIGS. 3A-3F, for the exemplary map of FIG. 1, an exhaustive list of path validations (i.e. all potential roads a vehicle may take in the vicinity of building 105) are created based on position refresh frequency states and areas B-D. The user, server 511, or computing device 501 may program or adjust to increase or decrease the position refresh frequency in any of the areas A-D based on usage, user patterns or behaviors, or based on power consumption of the computing device 501.

The position refresh frequency states 201, 203, 205, 207, and 209 may reduce power consumption by segmentation of position refresh frequency rates from low to high refresh frequencies thereby reducing or eliminating exhaustive or excessive location monitoring for location-based services (LBS). Additionally, triggering distances $d_{AB}$, $d_{BC}$, and $d_{CD}$ may be limited to a predetermined distance of between about 15 meters and about 200 meters. For example, the sum of triggering distances traversed by vehicles 1a-1h may be configured to be between about $d_{AB}+d_{BC}+d_{CD}=45$ meters and about $d_{AB}+d_{BC}+d_{CD}=600$ meters. Moreover, triggering distances $d_{AB}$, $d_{BC}$, and $d_{CD}$ may be configured by a user based on their geography, roadways, and driving conditions.

Beginning with position refresh frequency state 201, vehicles 1f-1h within area B may require increased position refresh frequencies $f_B$ to accurately determine whether a proximal user/vehicle is approaching to enter building 105 or passing by building 105. As shown inside area B, position refresh frequencies $f_B$ remains at a high rate inside radius $R_B$ and outside of radius $R_A$, to determine whether the vehicle is approaching to enter building 105. Continuing with position refresh frequency state 203, when a vehicle 1e moves outside of radius $R_B$ and inside radius $R_C$, the position refresh frequencies $f_C$ is reduced to reduce power consumption of computing device 501. As seen in FIG. 1, there are alternate paths (e.g. triggering distances $d_{B1C1}$, $d_{B2C2}$, and $d_{B5C5}$) for vehicles 1c, 1d, and 1f, that may not cross perimeter 150b and enter area B. Therefore, position refresh frequencies $f_C$ may be reduced from position refresh frequencies $f_B$ to capture valid pathways for a vehicle outside of area B yet reduce power consumption of computing device 501. Similarly, in position refresh frequency state 205, position refresh frequencies $f_D$ may be reduced from position refresh frequencies $f_C$ as these pathways between radius $R_C$ and radius $R_D$ may not necessarily pertain to a vehicle approaching to enter a building 105.

Figure 3B:
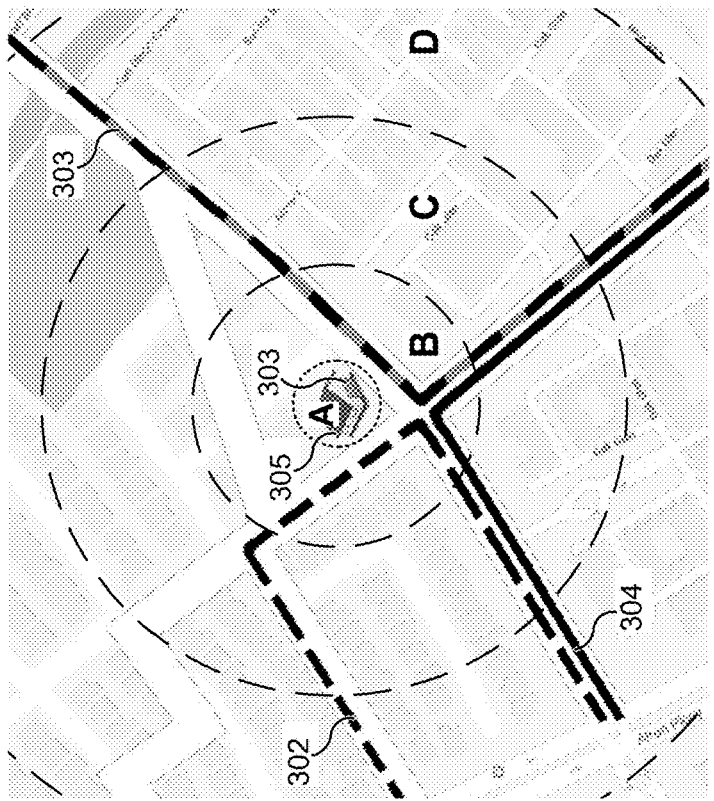
FIG. 3B illustrates an exemplary embodiment of a set of mapped vehicle geolocation patterns entering one or more geographic areas of FIG. 1 creating a multi-pass with no action according to one or more exemplary embodiments of the present disclosure.
Figure 3A:
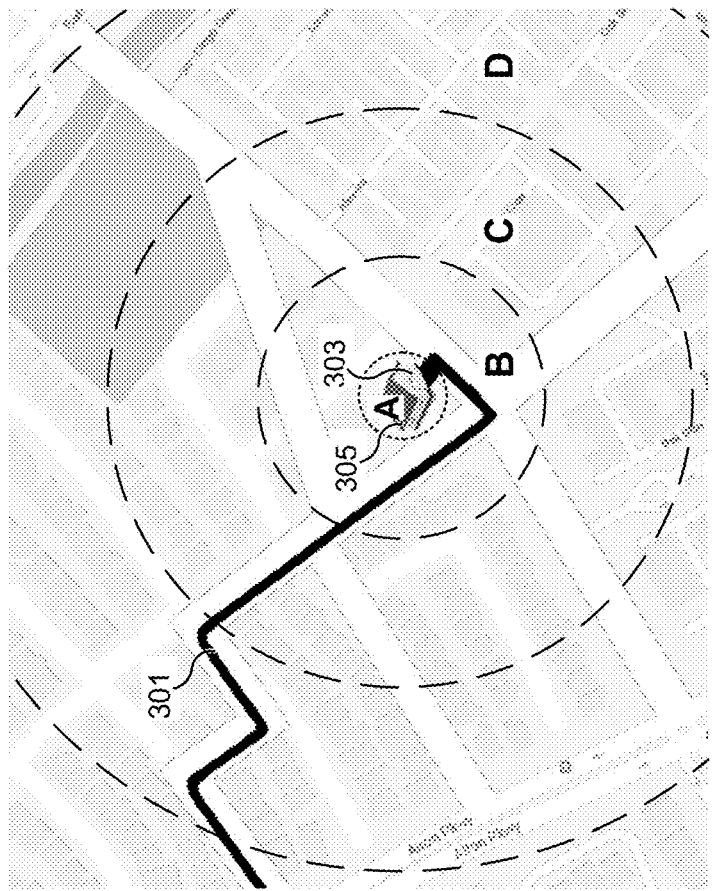
FIG. 3A illustrates an exemplary embodiment of a set of mapped vehicle geolocation patterns entering one or more geographic areas of FIG. 1 creating a single pass initiating an action by single pass according to one or more exemplary embodiments of the present disclosure.
Figure 3D:
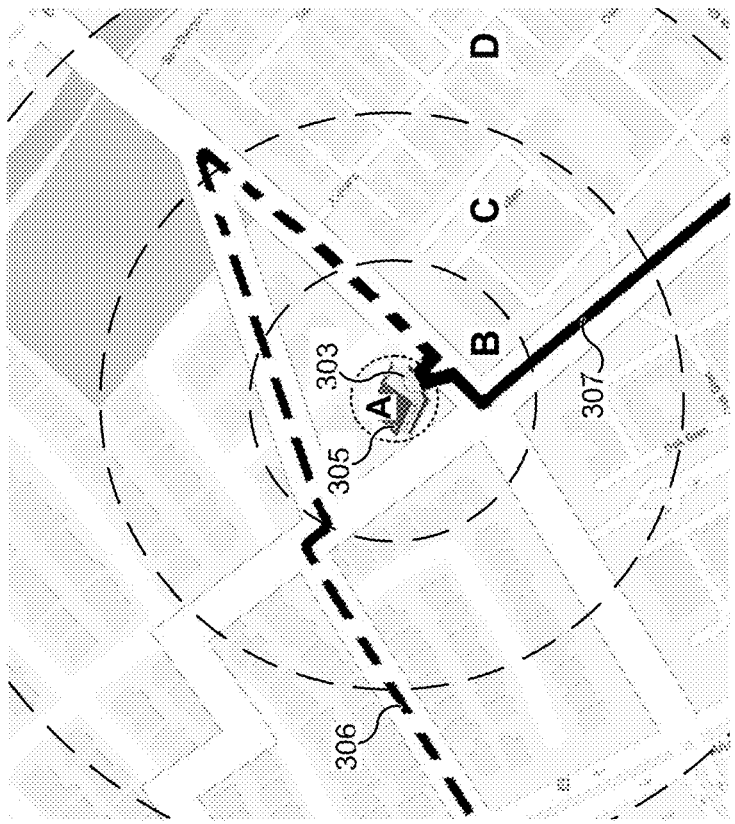
FIGS. 3C-3D illustrate an exemplary embodiment of a set of mapped vehicle geolocation patterns entering one or more geographic areas of FIG. 1 creating a multi-pass initiating an action by according to one or more exemplary embodiments of the present disclosure.

In position refresh frequency state 207, as shown in FIG. 1 and path 306 of FIG. 3D, vehicle 1d leaves building 105 exiting areas B and C, passing triggering distances $d_{AB}$, $d_{B3C3}$, $d_{B2C2}$, a portion of $d_{B5C5}$, and $d_{B6C6}$, and position refresh frequencies $f_D$, $f_C$, and $f_B$. The path 306 shown in FIG. 3D may be formed through numerous path validations comprising of a vehicle 1a-1h having passed, a number of times, through areas D through B and traversing triggering distances $d_{CD}$, $d_{BC}$, and $d_{AB}$ as determined by position refresh frequency states 201, 203, and 205 and GPS information of computing devices 501 and/or vehicles 1a-1h.

In position refresh frequency state 209, as shown in FIG. 1 and path 307 of FIG. 3D, vehicle 1h arrives at building 105 passing areas D, C, and B, triggering distances $d_{CD}$, $d_{B4C4}$, and $d_{A1B1}$, and position refresh frequencies $f_D$, $f_C$, and $f_B$. The path 307 shown in FIG. 3D may be formed through numerous path validations comprising of a vehicle 1a-1h having passed, a number of times, through areas D through B and traversing triggering distances $d_{CD}$, $d_{BC}$, and $d_{AB}$ as determined by position refresh frequency states 201, 203, and 205 and GPS information of computing devices 501 and/or vehicles 1a-1h.

Moreover, built-in OS API, System Standard API, or other Location Based Service process of the computing devices 501 and/or vehicles 1a-1h may analyze the movement of the user for determining whether to operate smart appliances 103 (e.g. smart garage door opener, smart lock, etc.,) and local electronic devices 541 (e.g. smart thermostat, smart lights, etc.,). Further, the movement of the user may be used to limit the position refresh frequency rate of computing devices 501 and/or vehicles 1a-1h thereby further reducing power consumption.

Figure 2B:
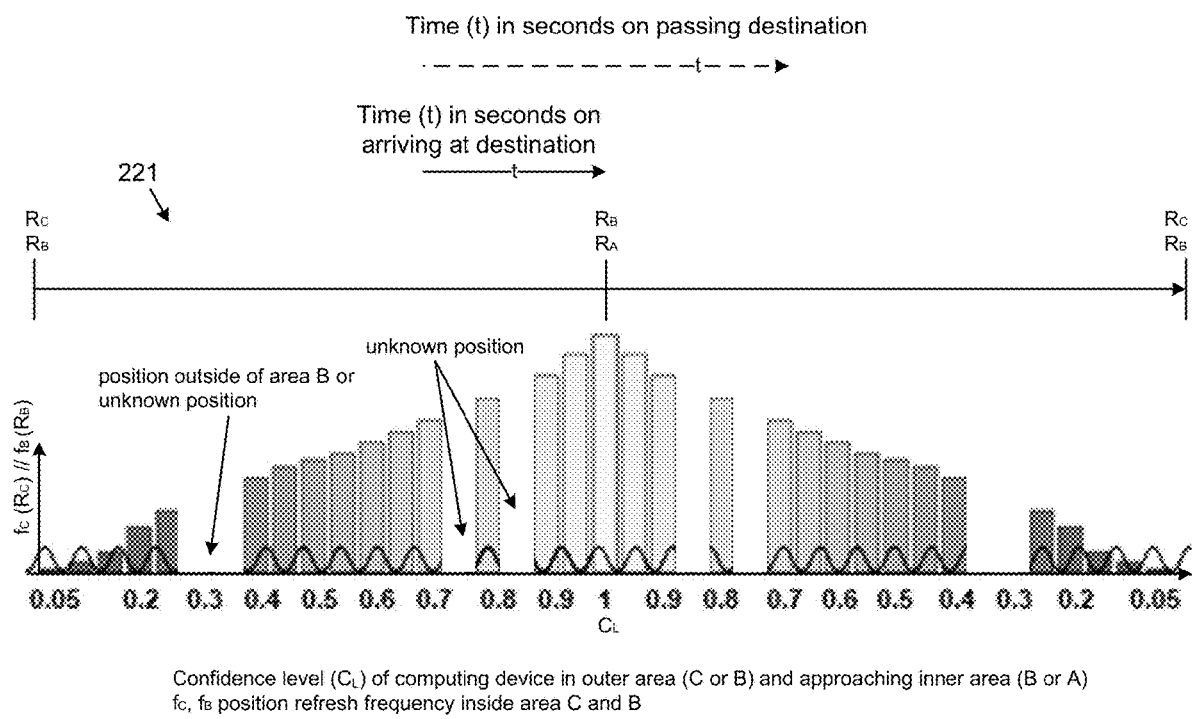
FIG. 2B illustrates an exemplary embodiment of confidence levels of vehicle geolocation within a geographic area of FIG. 1, according to one or more exemplary embodiments of the present disclosure.

FIG. 2B illustrates an exemplary embodiment of location confidence states 221 of computing devices 501 (e.g. mobile devices within vehicles 1a-1h, smart vehicle, etc.,) and/or vehicles 1a-1h approaching building 105. Upon receiving GPS location information based on position refresh frequencies 201, 203, and 205 from computing devices 501 (e.g. mobile devices within vehicles 1a-1h, smart vehicle, etc.,) and/or vehicles 1a-1h, an assessment is made on the likelihood of a user approaching to enter building 105. Several assessments may be used to evaluate the likelihood of a user (i.e. vehicles 1a-1h or computing device 501) approaching to enter building 105. For example, the velocity of the computing device 501 and vehicle 1a-1h may be evaluated to ensure the user is driving within areas B and C to enter a garage, gate, or other moveable barrier. Additionally, the locations of vehicles 1a-1h into areas B, C, and D using, for example, position refresh frequencies $f_D$, $f_C$, and $f_B$ may be evaluated to compare the vehicle path with validated vehicle paths for entering building 105 as stored on a server 511, computing device 501, local electronic device 541, or other remote computing device or database accessible by smart appliances 103 and local electronic devices 541. Moreover, the amount or segments of triggering distances $d_{CD}$, $d_{BC}$, and $d_{AB}$ traversed may be further evaluated to determine the timing of operation for smart appliances 103 and local electronic devices 541 when computing devices 501 or vehicle 1a-1h is within areas B or C and approaching building 105.

As shown FIG. 2B, the location confidence states 221 indicates, based on the above criteria, the confidence of operating, for example, a gate, garage, or moveable barrier, smart appliances 103, or local electronic devices 541 by using vehicle location accuracy (e.g. position, velocity, trajectory) and operational timing (e.g. path validation data, triggering distances $d_{CD}$, $d_{BC}$, and $d_{AB}$ and areas A-D traversed) for accessing or controlling smart appliances 103 and local electronic devices 541.

The confidence levels may indicate the amount of area A-D traversed by a vehicle 1a-1h along a valid path. A valid path being assigned one or more triggering distances $d_{AB}$ within its area (e.g. area B). Confidence levels $C_L$ may pertain to areas proximal to building 105, for example, areas B and C. The confidence level $C_L$ may distinguish vehicles 1a-1h passing through significant portions of valid pathways in areas proximal to building 105. As the user/driver approaches building 105 entering inner areas B and C, the confidence level $C_L$ begins to increase.

A vehicle passing through a significant amount of triggering distances $d_{AB}$ within an area B increases the confidence level $C_L$ of the likelihood of a user/driver desiring to enter building 105. As shown in FIG. 1 and FIGS. 3A-3F, valid pathways may comprise of one or more triggering distances $d_{AB}$ segments within each area. For example, path 304 of FIG. 3B may comprise of triggering distances $d_{CD}$, $d_{B4C4}$, portions of $d_{A1B1}$ and $d_{A2B2}$, and $d_{BC}$. In the case of path 304, server 511, computing device 501, or other remote computing device compares the sum of all triggering distances collected with the valid pathway stored in a database. Thus, when a vehicle passes through a substantial amount of all triggering distances, server 511, computing device 501, or other remote computing device may send a control signal to operate the smart appliances 103 and/or local electronic devices 541.

The lower threshold for detecting a user/driver approaching to enter building 105 may range from about 0.65 $C_L$ to about 0.85 $C_L$. The upper threshold for operating smart appliance 103 or local electronic devices 541 of building 105 may range from about 0.70 $C_L$ to about 0.89 $C_L$. Upon reaching the lower threshold the server 511, computing device 501, smart appliances 103, or local electronic devices 541 may evaluate, based on path validation, user driver behavior, and vehicle velocity, the remaining distance needed for user/driver to traverse to arrive at the building 105. Upon determining the remaining distance, the server 511, computing device 501, smart appliances 103, or local electronic devices 541 may determine the upper threshold required to operate smart appliance 103 or local electronic devices 541 and provide a seamless experience using location-based services.

The server 511, computing device 501, smart appliances 103, or local electronic devices 541 may determine the approximate time needed for smart appliance 103 or local electronic device 541 to complete its operation. This may allow a user/driver to arrive at the building immediately upon completion of one or more operations of a smart appliance 103 or local electronic devices 541. In the case, smart appliance 103 takes approximately 6 seconds to complete its operation of opening a gate, garage, or moveable barrier, server 511, computing device 501, or other remote computing device may determine the remaining triggering distances $d_{AB}$ needed for user/driver to traverse to arrive at the building 105. In this case, traversing the remaining triggering distances $d_{AB}$ may take 8 seconds at 0.80 $C_L$, 7 seconds at 0.83 $C_L$, and 6 seconds at 0.81 $C_L$, upon detecting the lower threshold at, for example, 0.65 $C_L$ the smart appliance 103 or local electronic device 541 will begin to operate upon user/driver passing the upper threshold of 0.81 $C_L$.

Figure 3C:
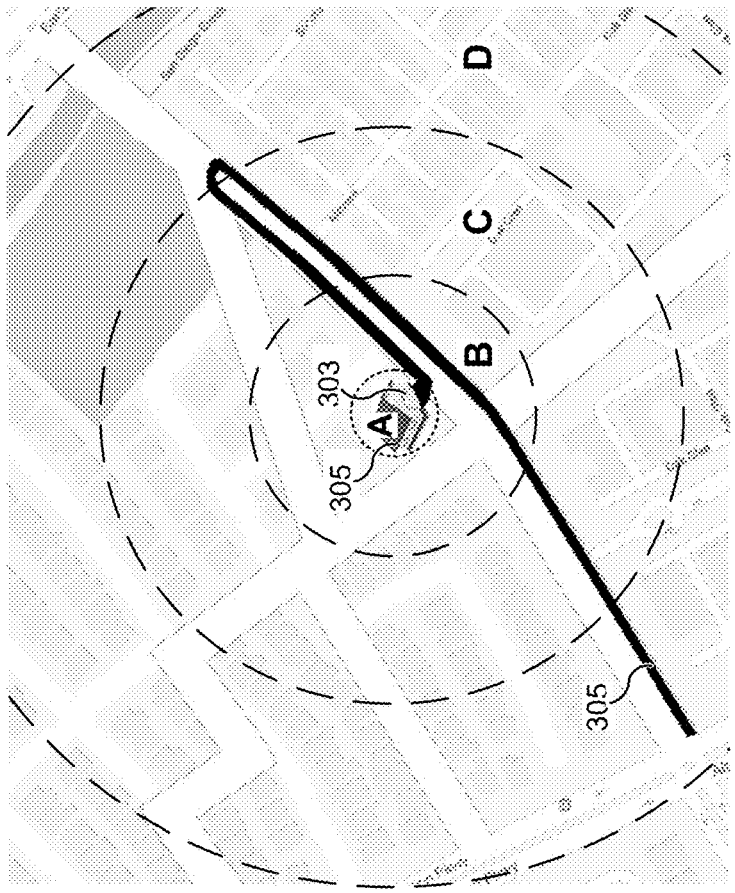
Figure 3F:
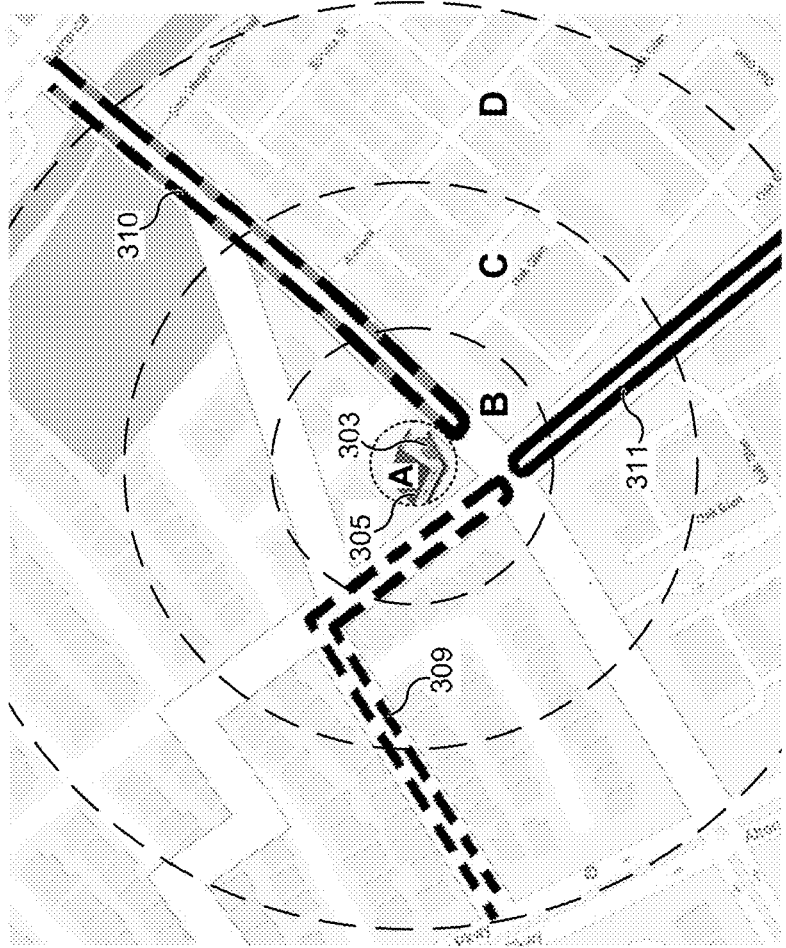
FIGS. 3E-3F illustrate an exemplary embodiment of a set of mapped vehicle geolocation patterns entering one or more geographic areas of FIG. 1 creating a pass by loop with no action according to one or more exemplary embodiments of the present disclosure.
Figure 3E:
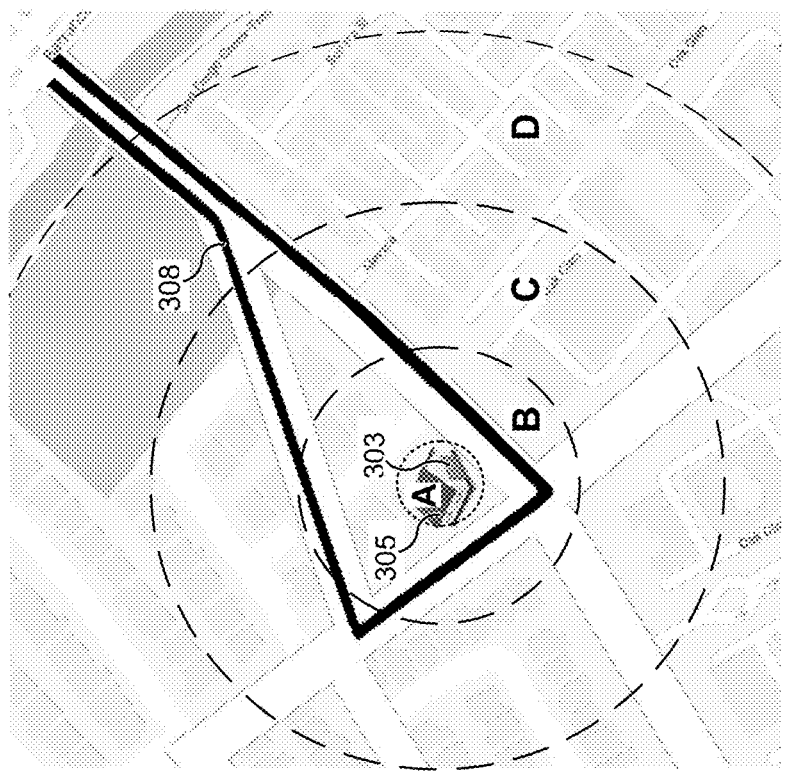

As shown in FIGS. 3B, 3E, and 3F, in the case the user/driver takes additional time, for example, the user/driver decides to pass by the building or turn around. The upper threshold time will be used to count down to operate/deactivate/close smart appliance 103 or local electronic device 541. Therefore, in this case, when the user/driver takes an additional 6 seconds, 12 seconds in total, smart appliance 103 or local electronic device 541 may begin to operate to close the gate, garage, or moveable barrier. In some exemplary embodiments, the confidence level $C_L$ may continue to be evaluated by the server 511, computing device 501, or other remote computing device after the upper threshold is triggered and prior to deactivating/closing the gate, garage, or moveable barrier. When, for example, the user/driver is within a predetermined distance away from area A (using area B for confidence level $C_L$) or area B (using area C for confidence level $C_L$) the gate, garage, or moveable barrier may stay opened, or smart appliance 103 or local electronic device 541 may stay on.

In some exemplary embodiments, the confidence level $C_L$ may indicate the radius traversed by user/driver. Still, in other exemplary embodiments, confidence level $C_L$ may indicate the percentage of triggering distances $d_{CD}$, $d_{BC}$, and $d_{AB}$ traversed by user/driver. In the case of lost connection or loss of position accuracy in the upper thresholds, the gate, garage, or moveable barrier is not operated. In the case of lost connection or loss of position accuracy in the lower thresholds or sub-lower thresholds, the location may be re-evaluated at a subsequent time.

FIGS. 3A-3F illustrate exemplary embodiments of path validations 301-311 from a set of collected vehicle geolocations for single and multi-passes of vehicles passing by building 305 initiating no action from smart appliance 303 or local electronic device 541, and single and multi-passes of vehicles entering building 305 initiating an action from smart appliance 303 or local electronic device 541.

Buildings 305 limited only to path validations on straight roads with few outlets, similar to the exemplary path validation 301 of FIG. 3A and 305 of FIG. 3C, may benefit from using area C for the confidence level $C_L$. While buildings 305 having path validations on numerous outlets, similar to the exemplary path validation 302-304 of FIG. 3B, may benefit from using area B for the confidence level $C_L$.

Buildings 305 having path validations along routes on neighboring roads or adjacent roads, similar to the exemplary path validation 306-307 of FIG. 3D and path validation 308 of FIG. 3E, may benefit from using area B for the confidence level $C_L$ to reduce accidental operation of smart appliance 303 or local electronic device 541.

Lastly, buildings 305 having path validations with no through roads or no exit roads (e.g. a street with only one inlet or outlet) such as cul-de-sacs or courts, similar to the exemplary path validation 309-311 of FIG. 3F, may benefit from using area C for the confidence level $C_L$ to reduce accidental operation of smart appliance 303 or local electronic device 541.

In the above examples, the smart appliance 303 or local electronic device 541 may be configured by a user or server 511 to operate to close or lock a door, electronic device, or moveable barrier when computing device 501 or vehicle 1a-1h leaves area A or area B. Further, the smart appliance 303 or local electronic device 541 may be configured by a user or server 511 to operate to close or lock within a predetermined time (e.g. about 1 minute to about 3 minutes) of computing device 501 or vehicle 1a-1h being within area A or area B.

A tenant, user, or customer may configure their smart appliance 303 or local electronic device 541 through application on their computing device 501 or on a server 511 to grant entry access rights to a service provider (e.g. deliveryman, maid, babysitter, etc.,). Upon receiving access rights from a tenant, user, or customer, a service provider may deliver mail or packages in a neighborhood or neighboring cities relying on area to area geofencing to operate entry point device(s) (e.g. garage door, gate, entry door, etc.,). The service provider may use their computing device 501 or vehicle 1a-1h to deliver packages inside a dwelling 105 without the need to verify each dwelling address, user or customer shipping or tracking profile, or verify the delivery to protect against liabilities or reduce theft. Thus, the risks involved for package delivery is reduced and delivery times may be substantially improved. The service provider quickly and effortlessly operates a garage, gate, or entry door to open and close based on their route, the customer or user need, and the service providers schedule. Moreover, the service provider may be an authenticated user having verified their identity, background, and vehicle using the device and methods of the disclosed patent application incorporated by referenced above and entitled ACCESS VERIFICATION DEVICE AND METHOD, application Ser. No. 16/506,965.

Figure 4:
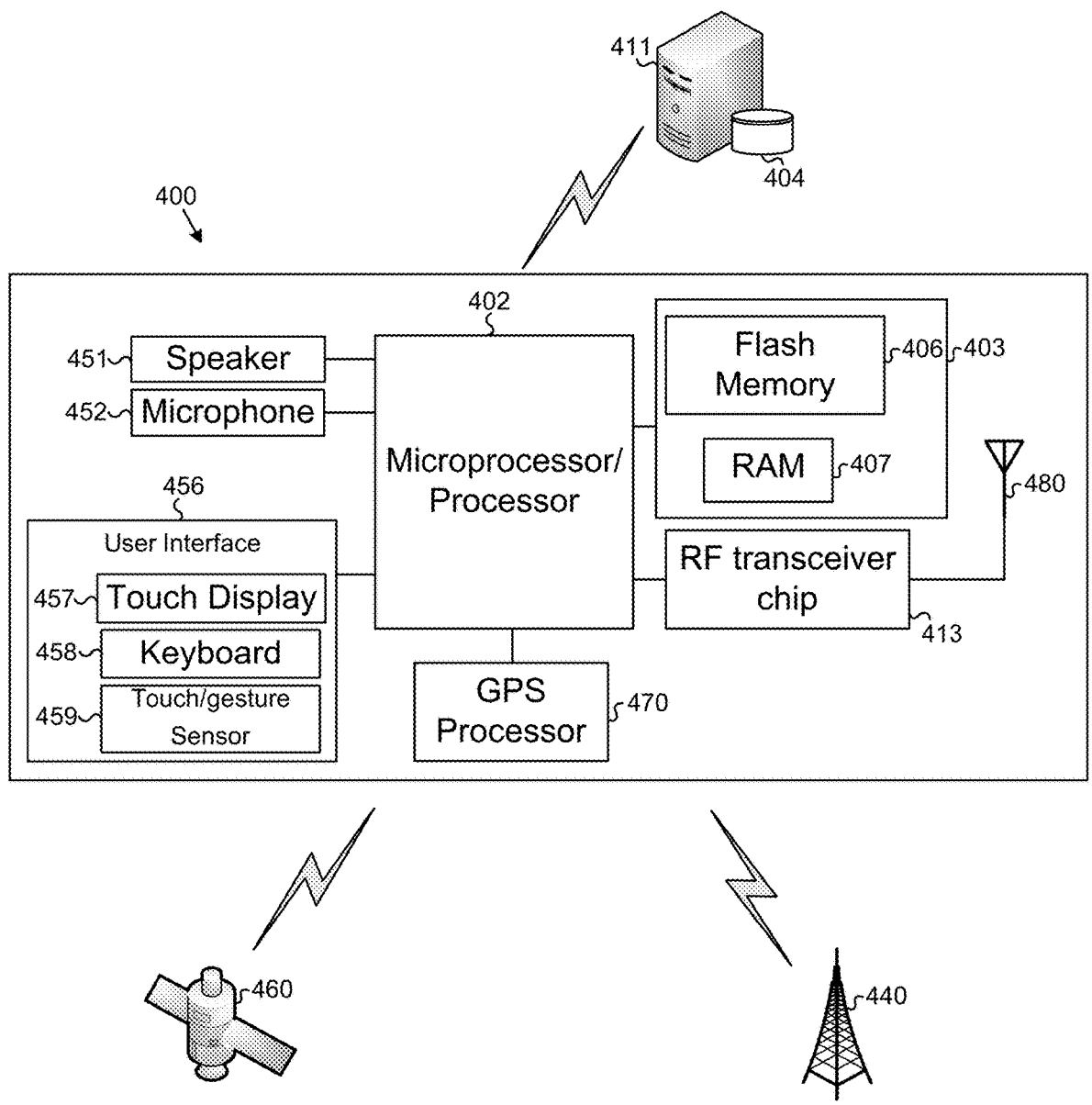
FIG. 4 illustrates an exemplary embodiment of the internal components of the location and proximity detection and geofencing system in accordance with one or more exemplary embodiments of the present disclosure.

FIG. 4 is a depiction of a wireless communications device 400 as one example of a computing device 501 that may be used in conjunction with a server 411 (e.g. geofencing server) to implement geofencing of the present disclosure. Examples of a wireless communications device 400 include cell phones, smart phones, mobile phones, portable digital assistants, tablets, notebooks, laptops, or any other such portable or handheld electronic communications devices.

As shown by way of example in FIG. 4, the wireless communications device 400 includes a processor 402 and memory 403 for executing one or more applications. The memory may include flash memory 120 and/or random access memory (RAM) 130. Other types or forms of memory may be used. The processor 402 may retrieve and execute instructions and/or data from memory/storage 403 to perform the processes of the present disclosure. Processor 402 may be a single processor, a multi-core processor, or multiple processors in different implementations.

Figure 6:
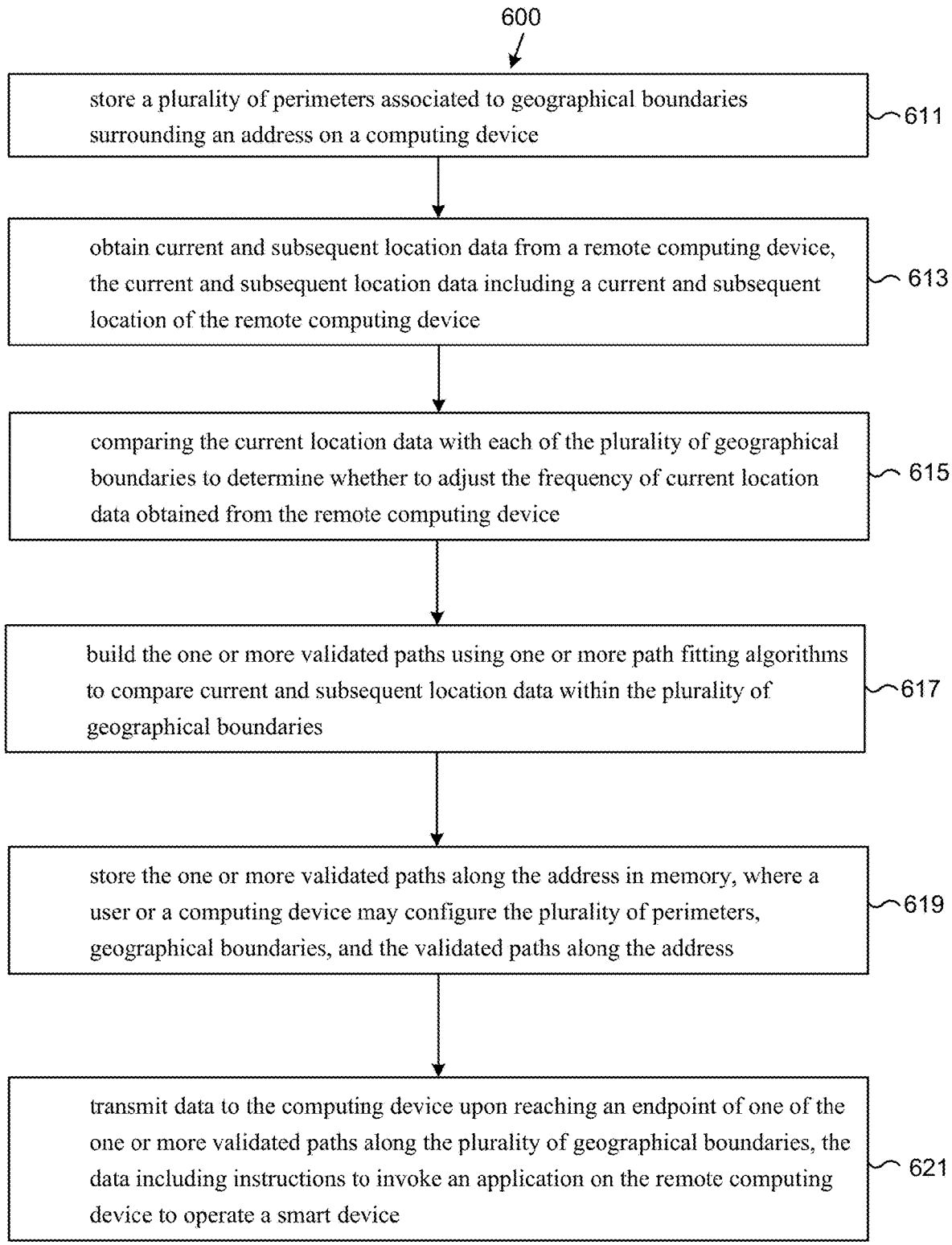
FIG. 6 illustrates an exemplary embodiment of a flowchart of server/device/user interactions based on location and proximity detection and geofencing system of FIG. 1 according to one or more exemplary embodiments of the present disclosure.

Instructions and data for operating wireless communications device 400 may be stored on, transmitted from, or received by any computer-readable storage medium (e.g., memory/storage of electronic devices 541, server 411) storing data (e.g., data in storage 404) that is accessible to a processor 402 during modes of operation of the wireless communications device 400. The wireless communications device 400 may access and execute instructions and/or data stored on any remote computing device (e.g. electronic device 541 or other computing device 501). The data may be a method instruction as depicted in FIG. 6. The method instructions are executable by processor 402, where the instructions include steps on how to remotely operate and configure one or more smart appliances 103, local electronic devices 541, or other computing devices 501.

The memory/storage 403 may include a dynamic random-access memory (DRAM) and/or a read-only memory (ROM). Memory/storage 403 may provide a temporary location to store data and instructions retrieved and processed by processor 402. Memory/storage 403 may include a non-volatile read-and-write memory that stores data and instructions, even when Wi-Fi/Internet is off, that may be retrieved and processed by processor 402. For example, memory/storage 403 may include magnetic, solid state and/or optical media, memory/storage 403 may be a single or multiple memory units as necessary. The memory/storage 403 stores all collected authentication factors, vehicle information, and environmental conditions (e.g. visual, audio, textual, voice, motion, velocity, speed, heat, temperature, humidity, air quality, proximity, etc.) provided directly from the computing device 501, or indirectly through a wireless connection to another electronic device(s), sensor(s), or server 411.

As depicted by way of example in FIG. 4, the wireless communications device 400 includes a user interface 456 for interacting with the wireless communications device 400 and its applications and, in this instance, for receiving user input (e.g. location or proximity settings) and communicating with other computing devices 501, electronic device(s) 541, sensor(s), or server 411. The user interface 456 may include one or more input/output devices, such as a display screen 457 (e.g. an LCD or LED screen or touch-sensitive display screen), and a keyboard or keypad 458. The user interface 456 may also include a touch/gesture sensor 459, for example, a camera, a motion sensor, thumbwheel, trackball, track pad or equivalent for receiving hand gestures or wheel input.

As depicted by way of example in FIG. 4, the wireless communications device 400 may include a wireless transceiver 413 connected to an antenna 480 for communicating with other devices. The transceiver 413 may be a radiofrequency (RF) transceiver for wirelessly communicating with one or more base stations 440 over a cellular wireless network using cellular communication protocols and standards for both voice calls and packet data transfer such as GSM, CDMA, GPRS, EDGE, UMTS, LTE, etc. Where the wireless communications device 400 may include a Subscriber Identity Module (SIM) card, an embedded-SIM (eSIM) or embedded universal integrated circuit card (eUICC) or programmable SIM card for GSM-type and CDMA-type devices. The transceiver 413 may further include one or more transceivers for short range wireless communication technologies such as Bluetooth™ and IrDA as well as other wireless technologies for building personal area networks (PANs). The wireless communications device 400 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls or instructions, the wireless communications device 400 includes a microphone 452, a speaker 451 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input.

Optionally, the wireless communications device 400 includes a positioning subsystem such as a Global Navigation Satellite System (GNSS) receiver which may be, for example, a Global Positioning System (GPS) receiver 470 (e.g. in the form of a chip or chipset) for receiving GPS radio signals transmitted from one or more orbiting GPS satellites 460. GPS (or other GNSS) satellites 460 transmit RF signals to the wireless communications device 400 to enable the wireless communications device 400 to obtain a position fix (i.e. generate current location data including the current location of the wireless communications device 400). Current location data may also be obtained using other techniques, e.g. Wi-Fi positioning based on nearby Wi-Fi routers 521. Other radiolocation techniques may be employed to determine location data, e.g. using cellular RF signals from the nearby base station transceiver(s) 440. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the wireless communications device 400 may include a Wi-Fi™ transceiver, a Bluetooth™ transceiver, and/or a near-field communications (NFC) chip. The wireless communications device 400 may also optionally include a transceiver for ZigBee™ (IEEE 802.15.4-2003 or other wireless personal area networks), an infrared transceiver or an ultra-wideband transceiver.

Optionally, the wireless communications device 400 may include other sensors like a digital compass and/or a tilt sensor or accelerometer.

The wireless communications device 400 interacts with the geofencing server 411 by determining its current location and by sending current location data to the geofencing server 411 to enable the geofencing server 411 to assess whether any geofence-related conditions have been triggered by the location or movement of the wireless communications device 400. The wireless communications device 400 may use its position-determining subsystem such as the GPS receiver 470 to generate current location data. The RF transceiver 413 of the wireless communications device 400 transmits the current location data to the geofencing server 411 which then compares the location data against the geofences to determine what data, if any, to send back to the wireless communications device 400.

The wireless communications device 400 may be used to create or define the geofences and to send these device-created (user-defined) geofences to the geofencing server 411 for storage and management (location monitoring and data-retrieval). Defining geofences (areas A-D, geographic perimeter overlays 150a-150d, and triggering distances $d_{AB}$, $d_{BC}$, and $d_{CD}$) on the wireless communications device 400 may be accomplished by using a graphical tool having a circular or polygonal shape or a lasso tool to draw segment(s) or area(s) on a map displayed on the display screen of the device. Alternatively, geofences may be defined using predetermined geographical entities, e.g. a city, district, state, province, country, postal code, area code, etc. Alternatively, geofences may be defined by entering a range of coordinates or street addresses to define one or more city blocks. The wireless communications device 400 may optionally execute a geofence management application that enables the mobile subscriber (device user) to interact with all geofences applicable to the device (e.g. to view, create, edit, delete, activate, inactivate, filter, create rules, impose conditions, etc.).

The wireless communications device 400 may also obtain pre-defined third-party geofences (i.e. geofences that have been already created by stores, boutiques, restaurants, cafes, hotels, bars, casinos, car rental companies, movie theatres, theme parks, museums, government agencies, etc.). These may be offered to the wireless communications device 400 and accepted (downloaded). Alternatively, the wireless communications device 400 user may proactively download any of these predefined geofences by visiting corporate or government websites which offer predefined geofences for content, e.g. location-based advertising, and/or for pre-scribed device-executable actions.

The processor 402 of the wireless communications device 400 is also configured to receive data from the geofencing server 411, to recognize the nature of this data as either content or device-executable actions. For content, the processor 402 of the device then uses the content in some way (e.g. stores the data, displays the content, etc.). For device-executable actions, the device performs the action, e.g. activates a hardware component, shuts down a hardware component, transmits data, switches a device setting, notification profile, etc.

Some of the geo-fencing actions may be user customized actions. For example, the user may configure an account or device profile at the geofencing server 411 to send additional device-executable actions if the device is at a specific location or area A-D (open garage door, turn on exterior lights, open front door, turn on thermostat, etc.). In that case, the geofencing server 411, in response to user settings in the profile stored at the server 411, may send additional device-executable actions. Another device-executable action may cause the device to send a message to users or a social network site to update the user's profile to indicate whether the user is arriving or leaving from the dwelling 105.

Figure 5:
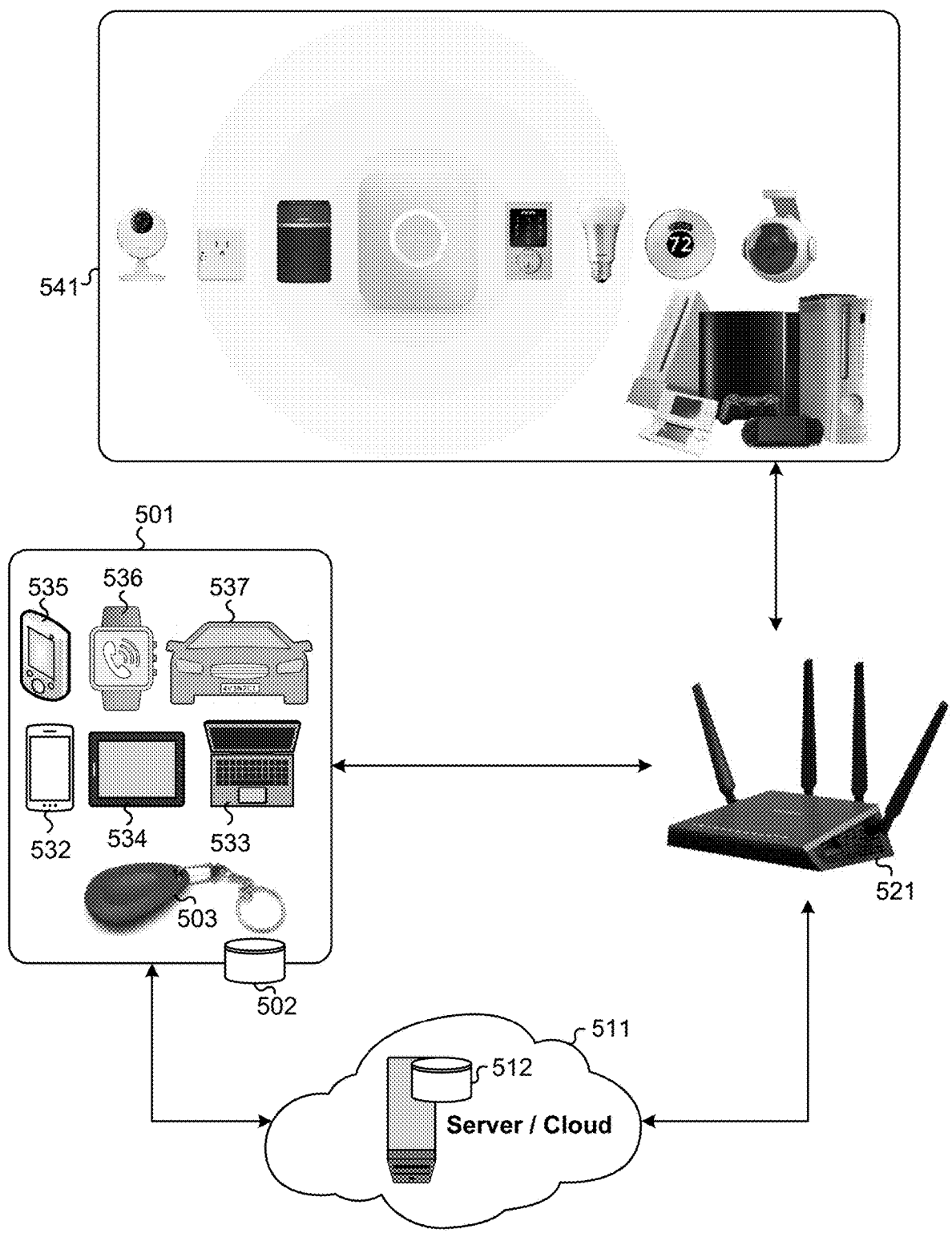
FIG. 5 illustrates an exemplary embodiment of the geofencing system of FIG. 1 communicating with other smart or wireless electronic devices according to one or more exemplary embodiments of the present disclosure.

FIG. 5 illustrates an exemplary embodiment of various computing devices 501 for facilitating geographic analysis, geographic perimeter designation, and geographic data collection to enable geofencing according to one or more exemplary embodiments of the present disclosure, computing devices 501 may communicate or receive user/driver location information (e.g. GPS). The computing devices 501 may comprise of wireless user devices 532, laptops 533, tablets 534, portable devices 535, wearable device 536, motors or vehicles 537, key fobs 503, and include one or more device storage 502 the like.

In some exemplary embodiments, computing devices 501 may be linked through Wi-Fi, LAN, WAN, Bluetooth, two-way pager, cellular connection, etc., to one or more electronic devices 541 and/or one or more other computing devices 501. The computing devices 501 may wirelessly communicate with one or more local electronic devices 541, other computing devices 501, and servers 511 and/or server storage 512 through, for example, a wireless router 521. The computing devices 501 may learn user habits, patterns, and behavior by communicating with one or more local electronic devices 541, other computing devices 501, and servers 511.

The local electronic devices 541 may include, for example, IP cameras, smart outlets, smart switches, smart lightbulbs, smart locks, smart thermostats, video game consoles and smart TVs, smart blinds, garage door monitoring and controlling devices, smart refrigerators, smart washer/dryer, smart devices powered on solar energy, etc., and the like.

The computing devices 501 may collect, store, and process user habits, patterns, and behavior to predict and/or learn appropriate actions based on user interactions with the computing devices 501, electronic devices 541, and servers 511. For example, the computing devices 501 may collect and process user interactions with, for example, the computing device 501 (e.g. vehicle 537, wireless user device 532, etc.,) status and location, or user(s) interaction with electronic devices 541 or server 511, or any combination of the above.

The computing devices 501 may communicate user interactions, habits, patterns, and behavior to a server 511, electronic devices 541, computing devices 501, or the like for further processing. For example, wearable device 536 may activate or operate garage door opener (e.g. electronic device 541) at certain times based on scheduling, user/vehicle location, or user interaction to collect and process user interactions, habits, patterns, and behavior.

Moreover, user interactions may be cataloged or stored in one or more databases (e.g. computing devices storage 502, or server storage 512, etc.,) for mapping out user habits, patterns, and behavior. The user habits, patterns, and behaviors may be used by computing devices 501, server 511, or one or more local electronic devices 541 to predict and/or learn appropriate actions and responses. In some embodiments, computing devices 501 or server 511 may communicate the appropriate actions and responses that may be taken by the one or more local electronic devices 541.

For example, the computing devices 501 may notify a user of their geolocation, validated path, perimeter proximity, path pattern, etc., based on their usage patterns or habits. Moreover, the user may be an admin and may be notified of other user geolocations, their status or location, and their proximity, path, patterns, or habits. The user activity may be collected by the computing devices 501 and/or one or more local electronic devices 541, or server 511. For example, the computing devices 501 may notify a user by playing an audio message when the user leaves an area A-D.

Furthermore, in some exemplary embodiments, the position refresh frequency rate for computing devices 501 may be in a normally dormant state (e.g. ECO Mode, Sleep Mode, etc.,) to reduce power consumption or adjusted position refresh frequency rate based on the computing device 501 location, velocity, or user habit or pattern. For example, the computing devices 501 may be off or substantially off (e.g. low power mode) until motion (e.g. indicative of vehicular motion), sound, or the user's location has substantially changed. In some exemplary embodiments, the computing device 501 (e.g. vehicle 1a-1h) may automatically trigger a higher position refresh frequency rate based on the vehicles speed, location, and the time of day. For example, vehicle 1e traveling in area C at a higher speed may trigger position refresh frequency rate $f_H$. The threshold speeds may range between about 1 mph to about 35 mph for triggering any of the position refreshing frequency rates $f_A$-$f_D$ or for collecting current location data or subsequent location data from one or more computing devices 501 or vehicles 1a-1h.

The computing devices 501 may be configured to wirelessly communicate and cooperate with local electronic devices 541 in real-time based on collected geolocation, environmental activity or stored visual, motion, audio, and environmental information in computing devices storage 502 or server storage 512.

A processor 402 of the computing device 501 and/or server 511 may operate the smart appliance 103 or electronic devices 541 to operate a smart device, for example, to open/close a garage door, lock/unlock a smart lock, or play an audio file or ring a smart doorbell, etc. Further, smart appliance 103 or electronic devices 541 operation may be based on any combination of collected environmental activity (e.g. video, audio, temperature, etc.,) from computing device 501 or vehicle 1a-1h, vehicle 1a-1h location, velocity, and trajectory, triggering distances $d_{AB}$, $d_{BC}$, $d_{CD}$, areas A-D crossed by vehicle 1a-1h or computing device 501.

The proximity of computing device 501 or vehicle 1a-1h from dwelling 105 may be used to operate electronic devices 541 (e.g. security camera, thermostat, smoke detector, smart lock, smart TV, etc.,). In some exemplary embodiments, electronic devices 541 may be communicably coupled to computing device 501 or vehicle 1a-1h to provide added security. For example, a security device (e.g. a camera, front lights, or smart lock) may operate when computing device 501 or vehicle 1a-1h approaches enters one or more areas A-D. In some exemplary embodiments, the computing devices 501 may use stored information in computing devices storage 502 or server storage 512 to determine whether to operate one or more electronic device 541.

The computing devices 501 may be configured to communicate between other computing devices 501 and electronic devices 541 (e.g. security devices, smart thermostat, smart devices, or smart appliances) by sending and retrieving proximity information, location information, schedule information, textual (e.g. email, SMS, MMS, text, etc.,), visual, motion, or audio information, as well as user access information shared between electronic devices. For example, the computing devices 501 may be configured to be notified by these smart devices of exterior weather conditions, vehicle or user location, traffic, pedestrians, air quality, allergens/pollen, peak hours, etc. Notification may be made through text, email, visual, or audio information provided by another computing device 501, server 511, and/or local electronic devices 541 or any other electronic device mentioned above.

The computing devices 501 may also operate local electronic devices 541 based on user conditions or preferences. For example, when a user opens a garage door through garage door controller and monitoring unit to park their vehicle, the computing devices 501 may relay commands to a server 511 to prevent a doorbell chime from ringing or a smart lock from operating to unlock a front door. However, the computing devices 501 may first prompt a user or user(s) before enabling such functionality. The computing devices 501 may be communicatively coupled to and controlled, programmed, or reprogrammed by local electronic devices 541 in dwelling 105, or programmed by one or more servers 511 to collect vehicle location, proximity, and trajectory data.

The computing devices 501 may also include a key fob 503 that a user may carry to operate local electronic devices 541 or smart appliance 103 or other any other entry point device. In some exemplary embodiments, the key fob 503 may be a RFID card or RFID device that may be attached to another computing device 501 or electronic device 541. In some exemplary embodiments, the computing devices 501 may be programmed by the user to respond to the key fob 503 based on a schedule, geo-location of a user, user preferences, etc. Responses may include any combination of, operating entry point devices, operating local electronic device 541, and the like.

In some exemplary embodiments, the computing devices 501 may take a snapshot of the individual, processes facial features of the individual, and creates a digital photo id, digital access id, or the like, for imprinting on an access card, key card, or key fob. The access id may be a physical type of id (e.g. key fob) or a digital type of id (e.g. access through facial recognition). The smart appliance 103 of dwelling 105 may include an entry point device (e.g. smart lock) that accepts key fobs or access cards created by the computing devices 501. In this way, the computing devices 501 may create physical access cards for entering through entry door or garage. A miniature or portable printing device may be attached or built into the computing devices 501 for printing the snapshot of the individual to create the access card, key fob, or key card. To have access to dwelling 105, the individual may, for example, download an APP for the computing devices 501 or receive permission to access and download the APP through a text or email message. The individual may then provide personal information, for example, phone number, name, email, address, date of birth, driver license, social security number, etc., to verify their identity and receive authorization to access dwelling 105. Upon providing the personal information and receiving authorization to operate local electronic device 541 or smart appliance 103, the computing devices 501 may verify the identity of the individual by taking a snapshot and requesting a verification code from a server 511.

The computing devices 501 may use a shared IP or dedicated IP. The computing devices 501 having a fixed or static IP may benefit from numerous advantages, such as but not limited to, less downtime or power consumption from IP address refreshes, Private SSL Certificate, Anonymous FTP, Remote access, and access when the domain name is inaccessible.

The path fitting algorithm data used for generating path validations 301-311 may be collected from a set of vehicle geolocations collected from one or more computing devices 501 or vehicles 1a-1h from single and multi-passes of the vehicle 1a-1h within a proximity of the building 305. The proximity of the vehicle 1a-1h or computing device 501 may be between about 200 meters to about 700 meters.

An exemplary path fitting algorithm may include the use of time series analysis, for example, dynamic time warping (DTW) algorithms that measure the similarity between two temporal sequences which may vary in speed. With each user or driver having different speeds, driving habits, or paths, the similarities in travel time or speed could be detected using DTW. DTW can be used to match paths thereby creating a valid list of paths that may be taken by a user of a computing device 501 or vehicle 1a-1h. However, any other path fitting algorithm method or methods may be used for measuring a sequence of distances within a predetermined amount of time to validate potential paths within a sequence of areas A-D in a proximity of a dwelling 105.

FIG. 6 illustrates a first exemplary method 600 of using the wireless communication device 400 to facilitate geofencing, or area to area geofencing, in accordance with one or more embodiments of the present disclosure. Method may apply to other exemplary embodiments of the geofencing system as disclosed in FIGS. 1-5. For explanatory purposes, the example process 600 are described herein with reference to one or more computing devices 501, servers 511, smart devices 103, vehicles 1a-1h, or electronic devices 541 of FIGS. 1-5; however, the example process 600 is not limited to computing devices 501, servers 511, smart devices 103, or electronic devices 541, and the example process 600 may be performed by one or more computing devices, smart devices, vehicles, or other electronic devices or components as disclosed in the cross-referenced applications incorporated by reference. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed. Further, any or all blocks of example process 600 may further be combined and done in parallel, in order, or out of order.

Each block shown in FIG. 6 represents one or more processes, methods or subroutines, carried out in the exemplary method. FIGS. 1-5 show exemplary embodiments of carrying out the methods of FIG. 6 for detecting, collecting, processing, and transmitting information. The exemplary method may begin at block 611.

Referring to FIG. 6, the exemplary method of the geofencing system of wireless communications device 400 may begin with storing a plurality of perimeters associated to geographical boundaries surrounding an address on a computing device as shown in block 611. The perimeter information for each geographical boundary may be drawn, collected, pre-selected, programmed by a server or drawn out by a user. The geographical boundaries may take any shape. Each perimeter may include one to numerous segments forming one area around an address, building, dwelling, or land as a geographical boundary. The computing device may include any combination of server 511 as storage 512, electronic device 541, computing devices 501 as storage 502, or smart devices 103, vehicles 1a-1h, or other electronic devices or components capable of storing and retrieving location information.

The process if followed by block 613 of obtaining current and subsequent location data from a remote computing device. The remote computing device may include one or more computing devices 501, smart devices 103, vehicles 1a-1h, or electronic device 541.

The process is followed by block 615 of comparing current location data with each of the plurality of geographical boundaries to determine whether to adjust the frequency of current location data (e.g. position frequency refresh rate) obtained from the remote computing device. The computing devices 501, smart devices 103, vehicles 1a-1h, electronic device 541, or server 511 may process current and subsequent location information provided by the remote computing device.

The process is followed by block 617 of building or constructing one or more validated paths by the computing devices 501, smart devices 103, vehicles 1a-1h, electronic device 541, or server 511 using one or more path fitting algorithms to compare current and subsequent location data within the plurality of geographical boundaries.

The process is followed by block 619 of storing the one or more validated paths along the address in memory on the computing devices 501, vehicles 1a-1h, electronic device 541, or server 511, where a user or a computing device (e.g. server 511) may configure the plurality of perimeters, geographical boundaries, and the validated paths along the address.

The process is followed by block 621 of transmitting data to the computing device upon reaching an endpoint of one of the one or more validated paths along the plurality of geographical boundaries, the data including instructions to invoke an application on the remote computing device to operate a smart device. The endpoint may define the arrival location or geographical coordinates of dwelling 105, or the geographical area A indicating a vehicle is within about 10-15 meters of the arrival location (e.g. dwelling 105).

The current or subsequent geographical location of computing device 501 or vehicle 1a-1h may be collected, streamed or broadcast, and/or recorded at any time (e.g. concurrently with, prior to, or after any block) in process 600. Moreover, at any time (e.g. concurrently with, prior to, or after any block) in process 600, the current or subsequent geographical location of computing device 501 or vehicle 1a-1h may be collected, stored, updated or allocated within a database of the server 511 in storage 512 or wireless communications device 400 in storage 404, or one or more electronic devices 541, defined by the user, or any combination thereof.

In blocks 611, 613, 615, 617, 619, and 621 the processor 402 and server 511 may perform any of the actions individually or together simultaneously to collect and provide the computing device 541, vehicle 1a-1h, electronic device 541, or smart device 103 with comprehensive location, visual, audio, and motion information.

Definitions and Non-Limiting Language

A computing device may be a smart device, a smart phone, a vehicle, a tablet, a laptop, a TV, or any electronic device capable of wirelessly connecting to a network or joining a wireless network. The computing device may be wirelessly and communicably associated to an individual either through a network or server (e.g. through a user account on the server, or WiFi™ login information), or through visual information collected by the server or computing device. The terms individual, wireless communications device, computing device, vehicle, wireless user device, and user may be used interchangeably throughout the present disclosure. A wireless communications device may be used interchangeably with the term computing device, electronic device, or vehicle.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using geofencing and a combination of visual, motion, and audio information. Geofencing may be defined as a virtual perimeter for a real-world geographic area. Geofencing may be accomplished using location aware devices through, for example, GPS, RFID technology, wireless network connection information, cellular network connection information, etc. Visual, motion, and audio information may be collected by a vehicle, computing device, electronic device, smart appliance, or server to substantiate a user(s)/transmitter(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity". "a vicinity". "within a vicinity", "within a predetermined distance", and the like may be defined between about 10 meters and about 2000 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching vehicle as the vehicle nears at least one garage door opener, or the distance of a departing vehicle as the vehicle moves further away from the at least one garage door opener. The predefined distance may be defined as between about 1 meter and about 2000 meters.

An action (e.g. first, second, third, etc.,) may comprise of a single action, set of actions, or a list or blend of actions based on one or more of: a proximity of a vehicle, computing device, electronic device, or smart appliance, a time of day, visual, motion, or audio information, a schedule, user(s) preferences, and the state of the entry or garage door, as will be described above. The action may be any one of: opening, closing, or partially opening a door, garage door, or moveable barrier. The action may also include playing a music file, sound file, greeting, or message in response to a detected change in the door status, or in response to a detected or defined audio, proximity, visual, or motion trigger. The action may also comprise of controlling other smart devices as communicated through the vehicle, computing device, electronic device, smart appliance, or server, for example, turning on a light fixture, outlet, and communicating with transmitter(s), wireless user device(s), or the detected individual(s). The action may also comprise of sending an email, text, or SMS to transmitters, individuals, smart devices, or wireless user device(s).

In response to any of the above actions, the action may also comprise of closing the garage door to a maximum point possible for safety, privacy, or security. The server, user, vehicle, computing device, electronic device, smart appliance, or wireless user device may perform any action or series of actions to achieve convenience, safety, security, or privacy for the user, resident, or tenant.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the geofencing system described in FIGS. 4-5, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed:

1. A server comprising:
a communication port for obtaining a plurality of geographical boundaries associated with an address and for obtaining current location data from a computing device, the current location data including a current location of the computing device;
a processor, the processor being operatively coupled to a memory and to the communication port, for comparing the current location data with each of the plurality of geographical boundaries to determine whether to adjust the frequency of current location data obtained from the computing device;
wherein the current location data is stored on the memory and wherein the processor compares subsequent location data with current location data to form one or more validated paths within the plurality of geographical boundaries, the subsequent location data including a location of the computing device subsequent to the current location of the computing device; and
wherein upon reaching an endpoint of one of the one or more validated paths along the plurality of geographical boundaries causes the server to transmit data to the computing device and transmit control instructions to operate a smart device;
wherein at least one of: a speed, velocity, or trajectory of the computing device are monitored and used to create at least one of the validated paths;
wherein the server uses one or more path fitting algorithms to build the one or more validated paths using the current location data and subsequent location data within the plurality of geographical boundaries; and
wherein the validated path is completely covered by one or more of the plurality of geographical boundaries.

2. The server of claim 1, wherein each of the plurality of geographical boundaries comprises of one or more segments forming a perimeter surrounding the address, wherein at least a portion of the perimeter for each geographical boundary crosses at least one validated path.

3. The server of claim 2, wherein the one or more validated paths comprises of roads traversable by a vehicle to the address, and wherein the server obtains current and subsequent location data from the computing device when the computing device meets a predetermined threshold speed along the one or more validated paths.

4. The server of claim 3, wherein the predetermined threshold speed along the one or more validated paths is between about 5-20 mph.

5. The server of claim 4, wherein the computing device traversing a first perimeter of a first geographical boundary triggers the computing device to adjust the frequency of current location data communication to the server to a first frequency rate;
wherein the computing device traversing a second perimeter of a second geographical boundary triggers the computing device to adjust the frequency of current location data communication to the server to a second frequency rate; and
wherein the computing device traversing a third perimeter of a third geographical boundary triggers the computing device to adjust the frequency of current location data communication to the server to a third frequency rate; and
wherein the second frequency rate is approximately equal to or greater than the first frequency rate, and the third frequency rate is approximately equal to or greater than the second frequency rate; and wherein the perimeter of the second geographical boundary forms a geographical area closer to the address and smaller than the perimeter of the first geographical boundary; and wherein the perimeter of the third geographical boundary forms a geographical area closer to the address and smaller than the perimeter of the second geographical boundary.

6. The server of claim 5, further comprising storing the plurality of perimeters, geographical boundaries, and validated paths along the address in memory, and wherein the user or server configures the plurality of perimeters, geographical boundaries, and validated paths along the address.

7. A computer-implemented method performed by a computing device having a processor operatively coupled to a memory, the method comprising:

obtaining a plurality of geographical boundaries associated with an address;

obtaining a current location data from a remote computing device, the current location data including a current location of the remote computing device;

comparing the current location data with each of the plurality of geographical boundaries to determine whether to adjust the frequency of current location data obtained from the remote computing device;

storing the current location data in the memory;

forming one or more validated paths within the plurality of geographical boundaries by comparing subsequent location data with current location data, the subsequent location data including a location of the remote computing device subsequent to the current location of the remote computing device; and transmitting data to the computing device upon reaching an endpoint of one of the one or more validated paths along the plurality of geographical boundaries, wherein the data comprises control instructions to operate a smart device;

wherein at least one of: a speed, velocity, or trajectory of the computing device are monitored and used to create at least one of the validated paths;

wherein the server uses one or more path fitting algorithms to build the one or more validated paths using the current location data and subsequent location data within the plurality of geographical boundaries; and wherein the validated path is completely covered by one or more of the plurality of geographical boundaries.

8. The method of claim 7, further comprising forming a perimeter surrounding the address for each of the plurality of geographical boundaries, wherein at least a portion of the perimeter for each geographical boundary crosses at least one validated path.

9. The method of claim 8, further comprising obtaining current and subsequent location data from the remote computing device when the remote computing device meets a predetermined threshold speed along the one or more validated paths, wherein the one or more validated paths comprises of roads traversable by a vehicle to the address.

10. The method of claim 9, wherein the predetermined threshold speed along the one or more validated paths is between about 5-20 mph.

11. The method of claim 10, further comprising:

adjusting the frequency of current location data collection from the remote computing device to a first frequency rate when the remote computing device traverses a first perimeter of a first geographical boundary;

adjusting the frequency of current location data collection from the remote computing device to a second frequency rate when the remote computing device traverses a second perimeter of a second geographical boundary;

adjusting the frequency of current location data collection from the remote computing device to a third frequency rate when the remote computing device traverses a third perimeter of a third geographical boundary;

wherein the second frequency rate is approximately equal to or greater than the first frequency rate, and the third frequency rate is approximately equal to or greater than the second frequency rate; and wherein the perimeter of the second geographical boundary forms a geographical area closer to the address and smaller than the perimeter of the first geographical boundary; and wherein the perimeter of the third geographical boundary forms a geographical area closer to the address and smaller than the perimeter of the second geographical boundary.

12. The method of claim 11, further comprising storing the plurality of perimeters, geographical boundaries, and validated paths along the address in memory, and wherein the user or computing device configures the plurality of perimeters, geographical boundaries, and validated paths along the address.

13. A non-transitory machine-readable medium comprising instructions stored therein, which, when executed by one or more processors of a processing system cause the one or more processors to perform operations comprising:

obtaining a plurality of geographical boundaries associated with an address;

obtaining a current location data from a remote computing device, the current location data including a current location of the remote computing device;

comparing the current location data with each of the plurality of geographical boundaries to determine whether to adjust the frequency of current location data obtained from the remote computing device;

storing the current location data in the memory;

forming one or more validated paths within the plurality of geographical boundaries by comparing subsequent location data with current location data, the subsequent location data including a location of the remote computing device subsequent to the current location of the remote computing device; and transmitting data to the computing device upon reaching an endpoint of one of the one or more validated paths along the plurality of geographical boundaries, wherein the data comprises control instructions to operate a smart device;

wherein at least one of: a speed, velocity, or trajectory of the computing device are monitored and used to create at least one of the validated paths;

wherein the server uses one or more path fitting algorithms to build the one or more validated paths using the current location data and subsequent location data within the plurality of geographical boundaries; and wherein the validated path is completely covered by one or more of the plurality of geographical boundaries.

14. The non-transitory machine-readable medium of claim 13, further comprising forming a perimeter surrounding the address for each of the plurality of geographical boundaries, wherein at least a portion of the perimeter for each geographical boundary crosses at least one validated path.

15. The non-transitory machine-readable medium of claim 14, wherein the computing device obtains current and subsequent location data from the remote computing device when the remote computing device meets a predetermined threshold speed along the one or more validated paths, wherein the one or more validated paths comprises of roads traversable by a vehicle to the address.

16. The non-transitory machine-readable medium of claim 15, further comprising:
    adjusting the frequency of current location data collection from the remote computing device to a first frequency rate when the remote computing device traverses a first perimeter of a first geographical boundary;
    adjusting the frequency of current location data collection from the remote computing device to a second frequency rate when the remote computing device traverses a second perimeter of a second geographical boundary;
    adjusting the frequency of current location data collection from the remote computing device to a third frequency rate when the remote computing device traverses a third perimeter of a third geographical boundary;
    wherein the second frequency rate is approximately equal to or greater than the first frequency rate, and the third frequency rate is approximately equal to or greater than the second frequency rate; and
    wherein the perimeter of the second geographical boundary forms a geographical area closer to the address and smaller than the perimeter of the first geographical boundary; and
    wherein the perimeter of the third geographical boundary forms a geographical area closer to the address and smaller than the perimeter of the second geographical boundary.

17. The non-transitory machine-readable medium of claim 16, further comprising storing the plurality of perimeters, geographical boundaries, and validated paths along the address in memory, and wherein the user or computing device configures the plurality of perimeters, geographical boundaries, and validated paths along the address.

* * * * *